US012570518B2

(12) United States Patent (10) Patent No.: US 12,570,518 B2

Clare (45) Date of Patent: Mar. 10, 2026

(54) CONTINUOUS PRODUCTION OF POCKETED SPRINGS

(71) Applicant: HS PRODUCTS LTD, Leeds (GB)

(72) Inventor: David Clare, Leeds (GB)

(73) Assignee: HS PRODUCTS LTD, Leeds (GB)

( * ) Notice: Subject to any disclaimer, the term of this patent is extended or adjusted under 35 U.S.C. 154(b) by 179 days.

(21) Appl. No.: 18/551,946

(22) PCT Filed: Mar. 23, 2022

(86) PCT No.: PCT/GB2022/050732

§ 371 (c)(1),
(2) Date: Sep. 22, 2023

(87) PCT Pub. No.: WO2022/200791

PCT Pub. Date: Sep. 29, 2022

(65) Prior Publication Data

US 2024/0166494 A1 May 23, 2024

(30) Foreign Application Priority Data

Mar. 26, 2021 (GB) ..................................... 2104307

(51) Int. Cl.
*B29C 65/08* (2006.01)
*B68G 9/00* (2006.01)
*B29L 31/00* (2006.01)

(52) U.S. Cl.
CPC .............. *B68G 9/00* (2013.01); *B29C 65/085* (2013.01); *B29L 2031/751* (2013.01)

(58) Field of Classification Search
CPC ......... B68G 9/00; B29C 65/08; B29C 65/085; B29C 66/43; B29C 66/73921; B29C 66/81427
USPC ........................................................ 156/73.1
See application file for complete search history.

(56) References Cited

U.S. PATENT DOCUMENTS 5,985,065 A * 11/1999 Kling .................. B29C 65/7443
156/580.2
2004/0103618 A1 6/2004 De Santis et al.
2014/0260088 A1 9/2014 Brolli

FOREIGN PATENT DOCUMENTS

WO 9721535 A1 6/1997
WO 2020030918 A1 2/2020

OTHER PUBLICATIONS

International Search Report and Written Opinion for corresponding International Application No. PCT/GB2022/050732, issued Jul. 1, 2022.

* cited by examiner

*Primary Examiner* — James D Sells

(74) *Attorney, Agent, or Firm* — Renner, Otto, Boisselle & Sklar, LLP

(57) ABSTRACT

An apparatus for welding together webs, the apparatus comprising first and second weld tools, wherein at least the first weld tool is rotatable about an axis of rotation and has a substantially cylindrical surface on which is located a welding contact portion, and wherein the welding contact portion extends at least partly circumferentially around the cylindrical surface and at least partly axially along the cylindrical surface.

11 Claims, 2 Drawing Sheets

CONTINUOUS PRODUCTION OF POCKETED SPRINGS

This application is a national phase of International Application No. PCT/GB2022/050732 filed Mar. 23, 2022, which claims priority to United Kingdom Application No. 202104307.0 filed Mar. 26, 2021, each of which is hereby incorporated herein by reference in its entirety.

The present invention relates to a method and an apparatus for the substantially continuous production of pocketed springs, and more particularly of strings of pocketed springs.

Resilient units, such as mattresses, are usually made using resilient elements, such as springs of coiled wire, located inside individual pockets of material. The pockets are formed around the springs by joining together leaves or webs of pocketing material, which may, for example, comprise non-woven, spun-bonded polyester.

Historically, springs would be pocketed individually and then joined together to form an array. As a variant of this method, several springs can be placed on a web of pocketing material which is then folded over the springs, before the individual pockets are established by joining the leaves of material between, and around, the springs. This forms what is referred to as a "string" of pocketed springs. The linear strings are then joined together, side by side, to form a two-dimensional array.

The welding of the leaves of pocketing material is usually performed using reciprocating pairs welding tools, such as ultrasonic welding tools, which come together briefly when movement of the web is paused. Temporarily halting the movement of the webs between welds limits the speed of production and is energy inefficient.

Embodiments of the present invention aim to provide an improved method and apparatus for the production of a pocketed spring unit, in which the aforementioned problem is addressed.

The present invention is defined in the attached independent claims, to which reference should now be made. Further, preferred features may be found in the sub-claims appended thereto.

According to one aspect of the present invention, there is provided an apparatus for welding together webs, the apparatus comprising first and second weld tools, wherein at least the first weld tool is rotatable about an axis of rotation and has a substantially cylindrical surface on which is located a welding contact portion, and wherein the welding contact portion extends at least partly circumferentially around the cylindrical surface and at least partly axially along the cylindrical surface.

The welding contact portion preferably comprises a ridge which may be raised from or may stand proud of the cylindrical surface.

The welding contact portion may be at least partly helical in shape.

In a preferred arrangement the welding contact portion extends less than completely around the circumference of the first weld tool. More preferably, the welding contact portion extends up to half way around the circumference of the welding tool. The welding contact portion is preferably arranged to extend substantially along the entire axial length of the first weld tool.

The apparatus preferably defines a web path along which webs that are to be welded together are arranged to pass. The rotational axis of the first weld tool is preferably arranged at a transverse angle with respect to the direction of the web path. In a preferred arrangement, the rotational axis of the first weld tool makes an angle with the direction of the web path which angle is less than 90 degrees.

The first weld tool may comprise a passive weld tool, such as an anvil and the second weld tool may comprise an active weld tool, such as a sonotrode. Alternatively, the first weld tool may comprise an active weld tool and the second weld tool may comprise a passive weld tool.

The apparatus may be arranged in use to weld webs that are of pocketing material, for example in the production of pocketed spring units.

According to another aspect of the present invention, there is provided a method of welding together superposed webs of material, the method comprising moving the webs in a path direction between first and second welding tools and bringing the welding tools towards one another to weld the webs at a location between the tools, wherein at least the first weld tool is made to rotate about an axis of rotation and has a substantially cylindrical surface on which is located a welding contact portion, and wherein the welding contact portion extends at least partly circumferentially around the cylindrical surface and at least partly axially along the cylindrical surface.

The first tool is preferably rotatable about an axis of rotation that is at a non-right-angle to the path direction.

The method preferably comprises presenting to the webs a contact portion of the rotatable tool, which contact portion extends along the axis of rotation in a substantially helical path.

The method preferably includes moving the webs substantially continuously and preferably includes rotating the rotatable tool intermittently or continuously and preferably at variable speeds.

The invention may include any combination of the features or limitations referred to herein, except such a combination of features as are mutually exclusive, or mutually inconsistent.

A preferred embodiment of the present invention will now be described, by way of example only, with reference to the accompanying diagrammatic drawings, in which.

Figure 1:
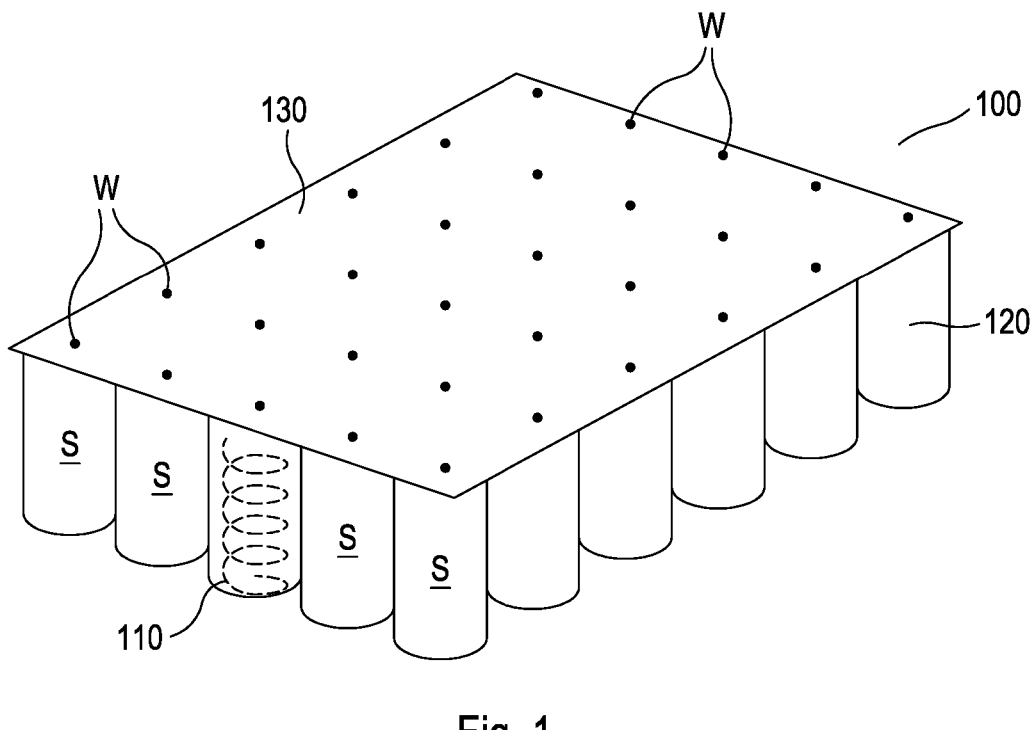
FIG. 1 shows a pocketed spring unit.

Turning to FIG. 1, this shows generally at 100 a pocketed spring unit, comprising metal coil springs 110 inside individual pockets 120 of material, such as spun-bonded polyester. A cover sheet 130 is shown joined to the tops of the springs by ultrasonic welds W. The unit 100 is made up of a number of linear strings S, each comprising a plurality of individual springs 110 in pockets. The strings S are assembled side by side before being welded to the common cover sheet.

Figure 2:
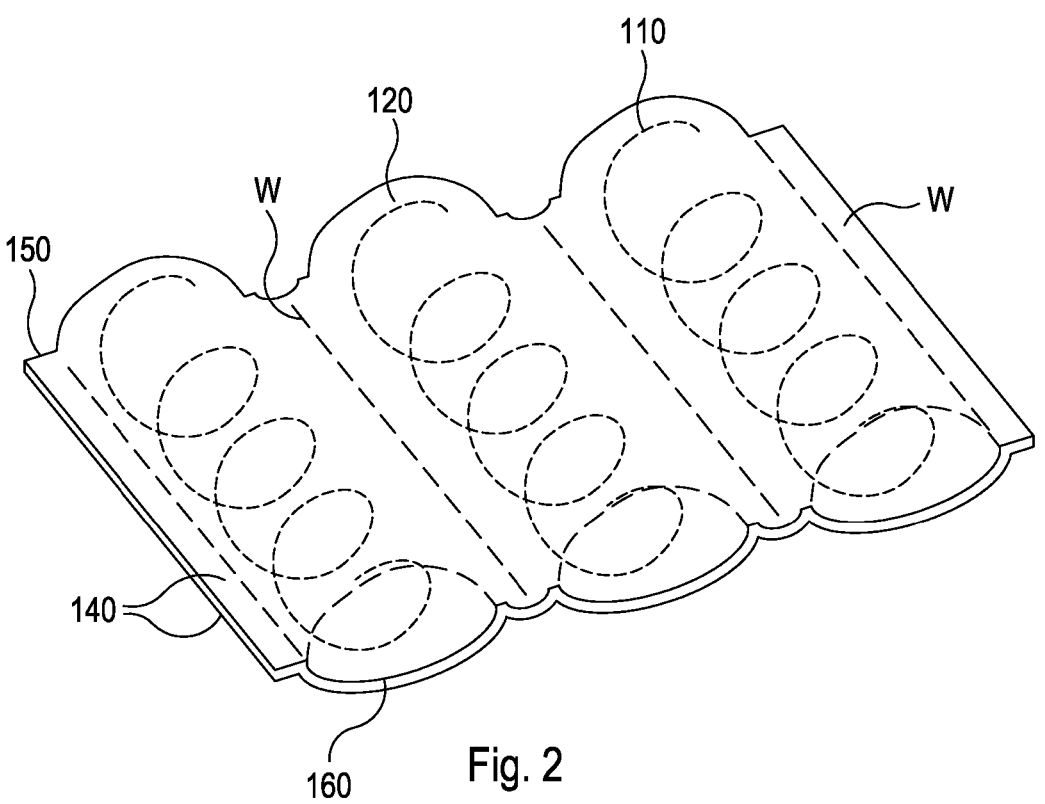
FIG. 2 shows part of a string of pocketed springs used in the manufacture of the spring unit of FIG. 1.

FIG. 2 shows a part of one string S of springs 110. The string is made by placing a row springs 110 onto a web or sheet 140 of pocketing material and folding the web over the springs before joining the webs together along axially extending edges 150 and at positions between the springs by welds W, so that the springs 110 are each encapsulated in an individual pocket 120 of material. The webs are also welded where they meet at the axial ends of the springs to form an end seam 160. If two independent webs are used then two end seams 160 must be formed to enclose the springs.

The string shown in FIG. 2 has only three springs 110. In reality the strings would contain many more, for example typically between ten and forty springs, more typically thirty two springs as an example, and the unit could comprise for example between ten and thirty such strings, more typically twenty four strings as an example. Within reason, any number of springs can be included in a string, and any number of strings can be combined to form a spring unit, according to the requirements of the product, which might typically be a mattress. The cover sheet is optional and, if employed, may be attached to either the upper ends of the springs, or the lower ends. In some embodiments a cover sheet is attached to both upper and lower ends. In embodiments which do not utilise a cover sheet, the strings may be joined directly to one another, for example by welding the pocketing material of one string to that of its neighbour (s).

Figure 3:
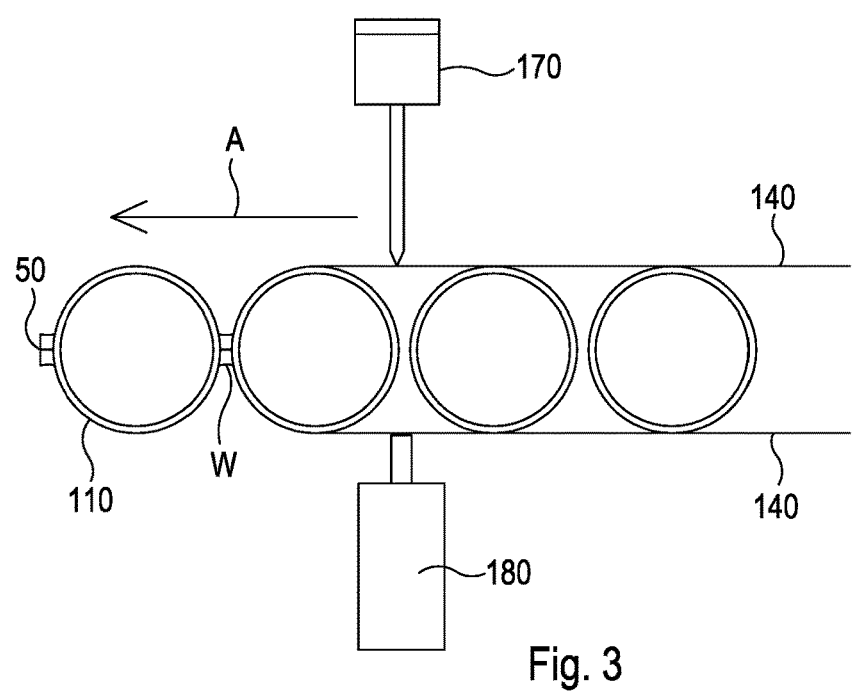
FIG. 3 shows a previously considered welding apparatus for the manufacture of the string shown in FIG. 2.

FIG. 3 is a schematic side view of a previously considered apparatus for forming the strings S shown in FIGS. 1 and 2. In the schematic, a row of springs 110, shown lying on their cylindrical side surfaces, are positioned between upper and lower webs 140 of pocketing material. The row is made to move stepwise in the direction indicated by Arrow A. After each stepwise advancement, a pair of ultrasonic welding tools 170, 180 come together between the springs to form welds W along the axial length of the spring. The webs are also welded along their edges—i.e. at the beginning and end of each row. If the webs are from the same sheet of pocketing material that has been folded over the springs, where the webs meet at the axial end of the springs they are also welded together. If the webs are completely independent, they are welded together at both axial ends to completely encapsulate the springs. Welding along the axial ends of the springs may be achieved using a different welding apparatus, not shown.

The ultrasonic welding tool 170 is a sonotrode, sometimes referred to as a "horn", and the tool 180 is an anvil. When the horn and anvil come together, an electrical signal causes the former to vibrate at a very high frequency, which causes the pocketing material to melt so that the webs 140 become fused together. For effective joining of the webs 140, a combination of sufficient pressure, time and power must be employed. However, as has been mentioned above, the constant pausing and re-starting, to allow the webs to be welded between the springs, has disadvantages. For one thing, it is inefficient in energy. Also, it constitutes a limitation on the rate at which the springs can be encapsulated, and hence on the rate of production of spring units.

Figure 4:
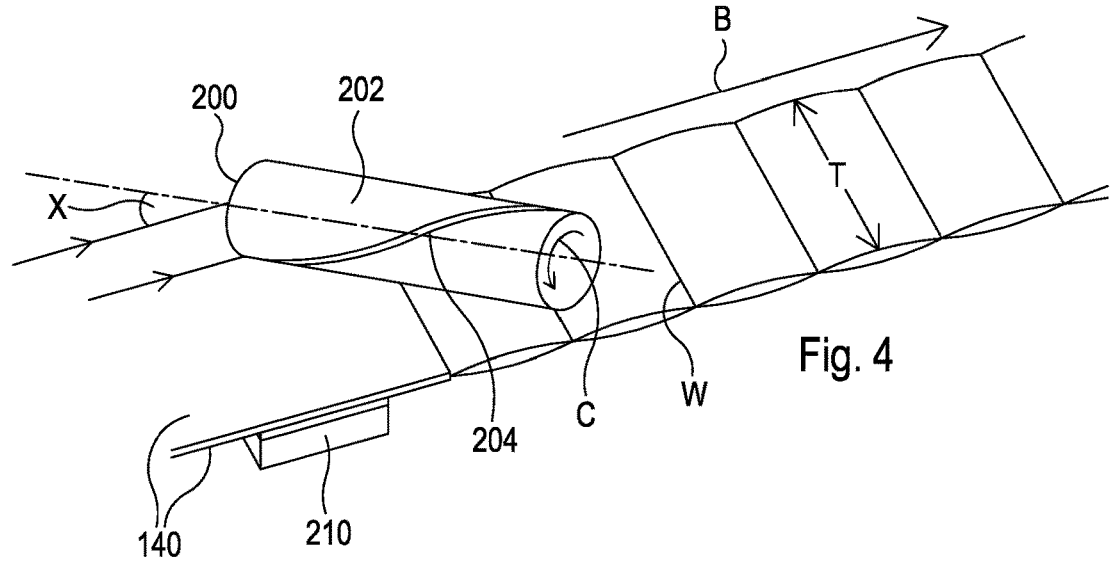
FIG. 4 shows, in schematic perspective view, a part of a welding apparatus for the manufacture of pocketed springs, in accordance with an embodiment of the present invention.

FIG. 4 shows in schematic perspective view an apparatus for forming pocketed spring units in which an alternative approach is employed in order to achieve a more efficient and faster welding of the webs 140. The webs 140 are welded together ultrasonically as before, but without the springs being first placed between them. Instead, the webs are brought together—either a single sheet folded on itself or else two independent webs superposed—without springs and then passed between ultrasonic welding tools 200 and 210 in a direction of advancement indicated by Arrow B. The sonotrode 200 comprises a generally cylindrical body positioned above the webs and the anvil 210 is a plate beneath.

On the cylindrical surface 202 of the sonotrode 200 is a substantially helical welding contact ridge 204 which extends substantially along the entire longitudinal length of the tool 200 but extends only partly around its circumference. In this example, the ridge 204 extends substantially 180 degrees around the circumference of the tool, but it could be a greater or a lesser extent. The tool 200 is positioned across the webs 140 such that its axis of rotation is not perpendicular to the direction of advancement. Rather, the rotational axis of the cylinder 200 forms an acute angle X with the direction of Arrow B. As the webs 140 pass beneath the tool 200 it rotates in the direction indicated by Arrow C so that the point of contact of welding contact ridge 204 with the webs 140 progresses along the transverse extent T of the webs, pressing the webs beneath the ridge 204 and the anvil 210 and causing the webs to be welded together at weld portions W. At least one axial end 220 is left unjoined at this stage so that the springs can be inserted later into the partially formed pockets formed between the parallel welds W.

The speed of rotation of the tool 200 is matched with the speed at which the webs 140 are fed so that the transverse welds W, the axial edges of what will be the discrete pockets for the springs 110 in the final string, are orthogonal to the extent of the webs. When no weld is to be made, the portion of the cylindrical surface of the tool 200 that does not carry the contact ridge 204 is presented to the webs, and they slide past unobstructed. When a weld is to be made, the tool is quickly rotated so that the axial end of the ridge is presented to the webs and then the tool is rotated at a speed that is matched to the movement of the webs, to effect the transverse weld. In this way, the spacing between the welds W, and hence the width of the eventual pockets, may be controlled precisely.

As an alternative to rotating the tool 200 intermittently, it may be rotated continuously but at a speed that varies. For example, the tool may rotate at a speed that matches the speed of movement of the webs during welding and then may increase or decrease in rotational speed when no weld is being made, to vary the spacing of the welds as required.

Note that there is no need for the webs to stop for the welding to take place. Because the contact area between the ridge 204 and the webs is very small at any given instant, the power supplied at that location is sufficient to weld the webs together, without pausing the movement of the webs.

Figure 5:
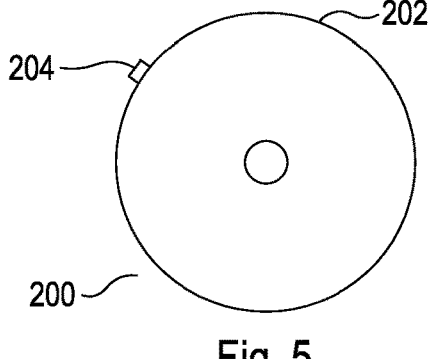
FIG. 5 shows part of the welding apparatus of FIG. 4 in schematic end view.

FIG. 5 shows in schematic side view the tool 200, including the welding contact ridge 204 extending proud of the substantially cylindrical surface 202.

The apparatus and method described herein enables a quicker, more efficient welding of webs, such as for the production of a pocketed spring unit.

Whilst endeavouring in the foregoing specification to draw attention to those features of the invention believed to be of particular importance, it should be understood that the applicant claims protection in respect of any patentable feature or combination of features referred to herein, and/or shown in the drawings, whether or not particular emphasis has been placed thereon.

The invention claimed is:

1. An apparatus for welding together webs, the apparatus comprising:

first and second weld tools, wherein at least the first weld tool is rotatable about an axis of rotation and has a substantially cylindrical surface on which is located a welding contact portion, wherein the welding contact portion extends at least partly circumferentially around the cylindrical surface and at least partly axially along the cylindrical surface, wherein the apparatus define a web path along which webs that are to be welded together are arranged to pass and the axis of rotation of the first weld tool is arranged transverse with respect to the direction of the web path, and wherein the first weld tool is arranged to rotate continuously at a speed that varies.

2. Apparatus according to claim 1, wherein the welding contact portion comprises a ridge which may be raised from the cylindrical surface.

3. Apparatus according to claim 1, wherein the welding contact portion is at least partly helical in shape.

4. Apparatus according to claim 1, wherein the welding contact portion extends less than completely around the circumference of the first weld tool.

5. Apparatus according to claim 1, wherein the welding contact portion extends substantially along the entire axial length of the first weld tool.

6. Apparatus according to claim 1, wherein the rotational axis of the first weld tool makes an angle with the direction of the web path which angle is less than 90 degrees.

7. Apparatus according to claim 1, wherein one of the first weld tool and the second weld tool comprises a passive weld tool, in the form of an anvil and the other comprises an active weld tool, in the form of a sonotrode.

8. A method of welding together superposed webs of material, the method comprising:

moving the webs in a path direction between first and second welding tools and bringing the welding tools towards one another to weld the webs at a location between the tools, wherein at least the first weld tool is made to rotate about an axis of rotation and has a substantially cylindrical surface on which is located a welding contact portion, wherein the welding contact portion extends at least partly circumferentially around the cylindrical surface and at least partly axially along the cylindrical surface, wherein a web path is defined along which webs that are to be welded together are arranged to pass the axis of rotation of the first weld tool is arranged transverse with respect to the direction of the web path, and wherein the first weld tool is rotated continuously at a speed that varies.

9. A method according to claim 8, wherein the first tool is rotatable about an axis of rotation that is at a non-right-angle to the path direction.

10. A method according to claim 8, wherein the method comprises presenting to the webs a contact portion of the rotatable tool, which contact portion extends along the axis of rotation in a substantially helical path.

11. A method according to claim 8, wherein the method includes moving the webs substantially continuously and includes rotating the rotatable tool substantially intermittently or continuously and at variable speeds.

* * * * *